United States Patent
Goh et al.

(10) Patent No.: US 9,950,340 B2
(45) Date of Patent: Apr. 24, 2018

(54) TRANSPARENT AND HEAT-INSULATING MATERIAL INCLUDING POLYMER CAPSULE AND METHOD FOR PREPARING THE SAME

(71) Applicant: KOREA INSTITUTE OF SCIENCE AND TECHNOLOGY, Seoul (KR)

(72) Inventors: Munju Goh, Wanju-gun (KR); Nam Ho You, Wanju-gun (KR); Hyeonuk Yeo, Wanju-gun (KR); Young Bum Hong, Wanju-gun (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 554 days.

(21) Appl. No.: 14/519,325

(22) Filed: Oct. 21, 2014

(65) Prior Publication Data
US 2016/0069069 A1 Mar. 10, 2016

(30) Foreign Application Priority Data

Sep. 5, 2014 (KR) .................. 10-2014-0118611

(51) Int. Cl.
| | | |
|---|---|---|
| C08L 83/00 | (2006.01) | |
| B05D 1/40 | (2006.01) | |
| C08J 5/18 | (2006.01) | |
| C08J 7/04 | (2006.01) | |
| C03C 17/00 | (2006.01) | |
| B32B 17/06 | (2006.01) | |
| E04B 1/74 | (2006.01) | |

(52) U.S. Cl.
CPC .............. *B05D 1/40* (2013.01); *B32B 17/066* (2013.01); *C03C 17/007* (2013.01); *C08J 5/18* (2013.01); *C08J 7/047* (2013.01); *B32B 2307/304* (2013.01); *B32B 2307/412* (2013.01); *C03C 2217/445* (2013.01); *C03C 2217/47* (2013.01); *C08J 2367/02* (2013.01); *C08J 2433/00* (2013.01); *C08J 2433/12* (2013.01); *E04B 2001/742* (2013.01)

(58) Field of Classification Search
CPC .. B05D 1/40; C03C 17/007; C08J 5/18; C08J 7/047
See application file for complete search history.

(56) References Cited

U.S. PATENT DOCUMENTS

| | | | | |
|---|---|---|---|---|
| 4,597,161 A | * | 7/1986 | Yamazaki | ........... H01L 27/1446 136/244 |
| 5,360,827 A | | 11/1994 | Toda et al. | |
| 2009/0062462 A1 | * | 3/2009 | Miyabayashi | ........... B01J 13/02 524/849 |

FOREIGN PATENT DOCUMENTS

| | | |
|---|---|---|
| CN | 102030483 A | 4/2011 |
| CN | 102504326 A | 6/2012 |
| CN | 103059632 A | 4/2013 |
| CN | 103665526 A | 3/2014 |
| JP | 06-248012 A | 9/1994 |
| JP | 08-165351 A | 6/1996 |
| JP | 2001-270021 A | 10/2001 |
| JP | 2003-082192 A | 3/2003 |
| JP | 2006-137926 A | 6/2006 |
| JP | 2007-307528 A | 11/2007 |
| JP | 2009-285864 A | 12/2009 |
| JP | 2010-065073 A | 3/2010 |
| JP | 2010-228223 A | 10/2010 |
| JP | 2013-543036 A | 11/2013 |
| KR | 10-2006-0131885 A | 12/2006 |
| KR | 10-0870908 | 11/2008 |
| KR | 10-1167108 | 7/2012 |
| KR | 10-2013-0116992 | 10/2013 |
| WO | WO 99/41067 | 8/1999 |
| WO | 2012-065288 A1 | 5/2012 |

OTHER PUBLICATIONS

Machine Translation of JP 2007-307528 (2007).*
Office Action dated Apr. 19, 2016 of Japanese Patent Application No. JP 2014-215209, which corresponds to the above referenced application.
Hwang et al. "influence of Different Polymerization Methodologies on Physical Properties of Polymer Particles", J. of Advanced Engineering and Technology, 2008, pp. 301-305, vol. 1, No. 2, Korea.
Communications of Japanese Application No. 2014-215209 dated Oct. 20, 2015, which corresponds to this application.
Communication from the Chinese Intellectual Property Office dated May 4, 2017, in a counterpart Chinese Patent Application No. 201410541721.3.

* cited by examiner

*Primary Examiner* — Hannah Pak
(74) *Attorney, Agent, or Firm* — Goldilocks Zone IP Law (57) ABSTRACT

Provided are a transparent heat-insulating material including a transparent heat-insulating resin layer including polymer capsules and an optical resin, and a method for preparing the same. The transparent heat-insulating material may reduce the transmission of radiative heat of solar radiation energy entering from the exterior, and prevent discharge or loss of heat when indoor heating, while showing high transparency as well. In addition, the transparent heat-insulating material may allow easy control of the size of capsules contained in a transparent heat-insulating film, and may be obtained through a simple and easy process. Further, it is possible to control the light transmittability and heat-insulating property of the transparent heat-insulating material with ease.

7 Claims, 6 Drawing Sheets

TRANSPARENT AND HEAT-INSULATING MATERIAL INCLUDING POLYMER CAPSULE AND METHOD FOR PREPARING THE SAME

CROSS-REFERENCE TO RELATED APPLICATION

This application claims priority to Korean Patent Application No. 10-2014-0118611, filed on Sep. 5, 2014, and all the benefits accruing therefrom under 35 U.S.C. § 119, the contents of which in its entirety are herein incorporated by reference.

BACKGROUND

1. Field

The present disclosure relates to a transparent heat-insulating material including polymer capsules and a method for producing the same.

2. Description of the Related Art

Many attempts have been made to save cost required for cooling and heating of buildings, particularly glass-walled buildings constructed largely in recent years.

Energy consumption in glass-walled buildings reaches 24% of the total energy consumption, and heat loss through windows occupies 30% of the total energy consumption on average and at least 7% of the total energy loss. Since the heat transfer coefficient of a window is at least 5 times higher than that of the outer wall or roof of a building, such a window is a main cause of heat loss. Moreover, in summer, solar radiation transmits through a window, which is one of the causes of cooling load, resulting in 66% of cooling load. In winter, during indoor heating, heat escapes through a window, which is one of the causes of heating load, and heat loss through a window reaches for 92% of heating load.

Therefore, many attentions have been given to improvement in the heat-shielding performance of a building window system. As a solution therefor, according to the related art, there has been suggested a method for connecting an inner part of a frame and an outer part thereof to each other with a non-metallic heat-insulating material having low heat conductivity to accomplish interruption of heat flow. In addition, air caps have been used to prevent conduction of cold air from outside through a glass window.

Further, some efforts have been made to increase heat-insulating quality through a temperature difference by introducing inert filler gas, such as air, argon or krypton, directly to pair glass.

However, according to the observation by the present inventors, the use of air caps or direct introduction of inert filler gas according to the related art is problematic in that it is difficult to ensure related techniques, such as durability upon sealing of such filler gas, gas mixing processes or control of mixing ratio, and further in that complicated processes are required and cost-efficiency is low.

Meanwhile, according to the related art (Korean Patent Publication No. 0870908), a method for producing a film-like glass heat-insulating material is disclosed, and the method includes carrying out extrusion molding of a blend of a polyvinyl chloride resin, microsilica capsules and a plasticizing agent.

However, according to the observation by the present inventors, the method is problematic in that it is not possible to control a size of microsilica capsules that affect transparency and heat-insulating property of glass, and thus it is difficult to control the transparency and heat-insulating property. Moreover, the method involves complicated processes.

SUMMARY

In one aspect, the present disclosure is directed to providing a transparent heat-insulating material and a method for producing the same wherein the transparent heat-insulating material may has an excellent heat-insulating property in such a manner that a transmission of radiative heat of solar radiation energy entering from outside is reduced and discharge or loss of heat when indoor heating is prevented, while showing high transparency as well.

In another aspect, the present disclosure is also directed to providing a transparent heat-insulating material and a method for producing the same wherein the transparent heat-insulating material may allow easy control of the size of capsules contained in the transparent heat-insulating material, and the method for producing the transparent heat-insulating material involves simple and easy processes and is suitable for mass production.

In yet another aspect, the present disclosure is also directed to providing a method for controlling transparency and heat-insulating property of a transparent heat-insulating material with ease.

In example embodiments, there is provided a transparent heat-insulating material including a transparent heat-insulating resin layer, wherein the transparent heat-insulating layer includes an optical resin; and polymer capsules.

In example embodiments, there is provided a method for producing a transparent heat-insulating material, including: preparing polymer capsules; and mixing the polymer capsules with an optical resin.

BRIEF DESCRIPTION OF THE DRAWINGS

FIG. 3 shows an actual photo of a transparent film (0 wt % of polymer capsules, FIG. 3a) according to Comparative Example and that of a transparent heat-insulating film (containing 30 wt % of polymer capsules, FIG. 3b) according to Example 3.

FIG. 4 is a graph illustrating transmittance of a transparent heat-insulating film according to Example 3 and a transparent film according to Comparative Example, as determined by a UV-Vis spectrometer. In FIG. 4, X axis shows a wavelength (unit: nm) and Y axis shows a transmittance (unit: %).

FIG. 5 is a graph illustrating heat conductivity of a transparent heat-insulating films according to Comparative Example and Examples, as determined by a heat conductivity tester. In FIG. 5, X axis shows a capsule content (unit: wt %) and Y axis shows a heat conductivity (unit: W/mK).

DETAILED DESCRIPTION

Example embodiments are described more fully hereinafter. The invention may, however, be embodied in many different forms and should not be construed as limited to the example embodiments set forth herein. Rather, these example embodiments are provided so that this disclosure will be thorough and complete, and will fully convey the scope of the invention to those skilled in the art. In the description, details of features and techniques may be omitted to more clearly disclose exemplary embodiments.

As used herein, the singular forms "a," "an" and "the" are intended to include the plural forms as well, unless the context clearly indicates otherwise. Furthermore, the use of the terms a, an, etc. do not denote a limitation of quantity, but rather denote the presence of at least one of the referenced item. The terms "first," "second," and the like do not imply any particular order, but are included to identify individual elements. Moreover, the use of the terms first, second, etc. do not denote any order or importance, but rather the terms first, second, etc. are used to distinguished one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments will be described in detail with reference to the accompanying drawings.

As used herein, 'transparent heat-insulating' means having transparency and heat-insulating property at the same time. Herein, for example, transparency is referred to as a light transmittance in the visible light spectrum region of at least 60% based on quartz, and heat-insulating property is referred to as a heat conductivity of 0.15 W/mk or less.

As used herein, 'optical resin' means a resin having light transmittability, particularly a resin having a light transmittance in the visible light spectrum region of at least 60%, at least 90%, at least 92%, or 92-98% based on quartz.

In example embodiments, there is provided a transparent heat-insulating material, such as a transparent heat-insulating film, including a transparent heat-insulating resin layer. The transparent heat-insulating resin layer includes an optical resin and polymer capsules.

According to an example embodiment, there is provided a transparent heat-insulating film (or sheet) including a substrate, and a transparent heat-insulating resin layer formed on the substrate.

Figure 1:
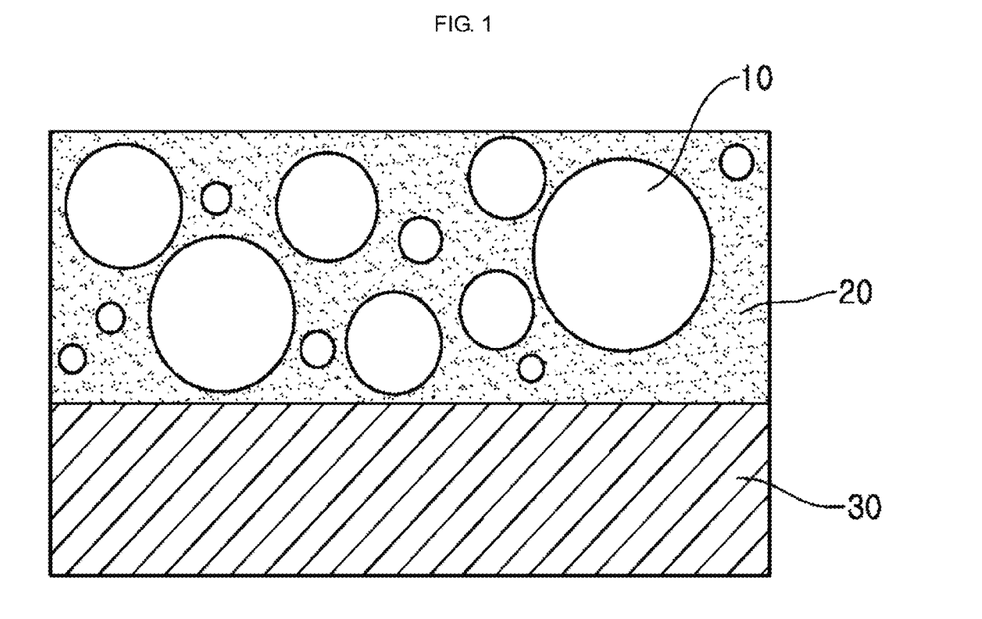
FIG. 1 is a schematic view illustrating a transparent heat-insulating film according to an embodiment.

FIG. 1 is a schematic view illustrating a transparent heat-insulating film according to an example embodiment.

As shown in FIG. 1, a transparent heat-insulating resin layer including an optical resin 20 and polymer capsules 10 is formed on a substrate 30.

According to an example embodiment, the optical resin is a resin having light transmittability so that it is applicable to a transparent heat-insulating film. The optical resin may have a light transmittance in the visible light spectrum region of at least 60%, particularly at least 90%, more particularly at least 92% or 92-98% based on quartz Various materials may be used as an optical resin as long as it has light transmittance within the above-defined range. For example, polyacrylic, polyolefin, polyurethane or polyepoxy resins, etc. may be used if the resin has the above-defined light transmittance. In addition, the optical resin may be a photocurable resin or thermosetting resin.

According to an example embodiment, it is required that the optical resin does not dissolve polymer capsules therein. Polymer capsules may be dispersed in the optical resin, preferably with no agglomeration, and more preferably with a random size distribution and no agglomeration, thereby forming a transparent heat-insulating resin layer.

According to an example embodiment, the polymer capsules are made of a polymer and may have a vacant space inside thereof. For example, at least a part of or the whole part of the polymer capsules may include a vacant space in the capsules, and a polymer film may surround the vacant space. Herein, the vacant space may be filled with gas.

As a non-limiting example, the polymer capsules may contain air (or an air layer) or contain an inert gas (or a gas layer), such as argon or krypton, etc. having a low heat conductivity.

When the transparent heat-insulating film includes such polymer capsules, its heat conductivity may be lowered as compared to the film without the polymer capsules, and transmission of radiative heat of solar radiation energy introduced from outside may be decreased and improve the shielding ratio of radiative heat rays. In addition, it is possible to reduce discharge or loss of heat occurring during the indoor heating.

Since the polymer capsules are made of a polymer, it is easy to carry out size control unlike inorganic capsules. The polymer capsules affect not only the heat-insulating property but also the transparency of a transparent heat-insulating film. According to example embodiments, since size of polymer capsules is controllable, it is easy to control the heat-insulating property and transparency of a transparent heat-insulating film.

The transparent heat-insulating film including the polymer capsules and the optical resin may show a light transmittance in the visible light spectrum region of at least 60%, particularly at least 63%, and more particularly at least 70% based on quartz.

In addition, while the transparent heat-insulating film including the polymer capsules and the optical resin has the above-defined light transmittance, at the same time it may show a high heat-insulating quality such as a heat conductivity of less than 0.2 W/mK, preferably 0.02-0.15 W/mK. Further, the transparent heat-insulating film may show substantially no optical distortion. Therefore, the transparent heat-insulating film may substitute for a glass window or may be attached to a glass window. The presence of optical distortion may be evaluated by measuring haze. For example, haze may be measured through a haze meter or spectrometer. According to an example embodiment, the transparent heat-insulating film may have a haze of 0.1% or less.

The polymer used for the polymer capsules is selected so that the above-defined light transmittance may be satisfied, considering the optical resin used together with the polymer capsules.

According to an example embodiment, the polymer capsules may have a difference in refractive index of 0-0.1 from that of the optical resin in view of light transmittance, haze.

For example, the refractive index may be measured by using an Abbe refractometer. As such, it is possible to control the transparency of a transparent heat-insulating material by controlling a difference in refractive index between the polymer capsules and optical resin.

According to an example embodiment, the polymer of polymer capsules and the optical resin should be selected to satisfy the above-defined difference in refractive index. The polymer of polymer capsules may be selected from polyacrylic (e.g. poly(methylmethacrylate)), polystyrene, polyurethane, polycarbonate, polyolefin, and polyimide polymers etc.

According to an example embodiment, the content of polymer capsules in the optical resin layer may be more than 0 wt % and 90 wt % or less based on 100 wt % of the total weight of the polymer capsules and the optical resin. Although the content of polymer capsules may be increased in order to improve heat-insulating quality, transparency may be degraded in this case. On the other hand, when reducing the content of polymer capsules, transparency may increase but heat-insulating property may be degraded.

From the viewpoint of the heat-insulating property (e.g. a heat conductivity of 0.02-0.15 W/mK) and transparency (e.g. a light transmittance in the visible light spectrum region of at least 60% based on quartz), the content of polymer capsules may be 0.1 wt %-60 wt % based on 100 wt % of the total weight of the polymer capsules and the optical resin. More particularly, the content of polymer capsules may be 10 wt %-50 wt % based on 100 wt % of the total weight of the polymer capsules and the optical resin. This is because when the transparent heat-insulating film includes the polymer capsules within the above range, it may show substantially the same transparency (a difference in transparency within 1%) as the film without polymer capsules, while ensuring excellent heat-insulating property (e.g. a heat conductivity of 0.02-0.15 W/mK).

According to an example embodiment, the substrate is used as a support for forming the transparent heat-insulating resin layer.

According to an example embodiment, the transparent heat-insulating material may be a transparent heat-insulating film, and the transparent heat-insulating film may include a substrate and a transparent heat-insulating resin layer, and the transparent heat-insulating film may be used without substrate by removing the substrate after forming the transparent heat-insulating resin layer on the substrate.

According to an example embodiment, when the transparent heat-insulating film includes a substrate, the transparent heat-insulating resin layer may be formed on either side or both sides of the substrate. As well, the transparent heat-insulating resin layer may be interposed between two substrates.

According to an example embodiment, the substrate may have a light transmittance in the visible light spectrum region of at least 60% based on quartz. For example, a transparent substrate such as glass or polyethylene terephthalate may be used as a substrate.

In example embodiments, there is also provided a method for producing the above-described transparent heat-insulating material.

The method may include: preparing polymer capsules; and mixing the polymer capsules with an optical resin.

According to an example embodiment, provided is a method for producing a transparent heat-insulating film that may include: preparing polymer capsules; and mixing the polymer capsules with an optical resin, and coating the substrate with a resultant mixture to form a transparent heat-insulating resin layer provided on the substrate.

According to an example embodiment, the method may further include removing the substrate after the coating.

According to an example embodiment, the polymer capsules may be prepared in various ways.

As a non-limiting example, the method may include: mixing and heating a surfactant, dispersant, organic solvent, radical polymerizable monomers and a radical polymerization initiator to provide polymer capsules; and mixing the polymer capsules with an optical resin, and coating a substrate with a resultant mixture.

Hereinafter, each of the above-mentioned ingredients will be explained in detail.

The surfactant may form spherical reverse micelles when it is dissolved in an organic solvent. It is possible to control size of reverse micelles formed in the solution depending on a ratio of surfactant. In light of this, the surfactant has to be used in such an amount that allows formation of reverse micelles. Further, since formation of reverse micelles affects formation of polymer capsules, it is possible to control a size of polymer capsules by adjusting the size of reverse micelles as mentioned above.

The organic solvent may serve as a solvent for forming reverse micelles. For example, a polar organic solvent, such as methanol etc., may be used.

Particular non-limiting examples of the surfactant that may be used include dioctyl sulfosuccinate sodium salt (AOT), or the like.

The initiator may be used for a radical polymerization. When radicals and a small amount of monomers dissolved in solution join with each other, initiation occurs. The initiated radicals may grow in solution, and have surface activity from the time point where the balance between the hydrophilic moiety of initiator and the hydrophobic moiety of monomers is maintained adequately.

Particular non-limiting examples of the initiator that may be used include 2,2'-azobisisobutyronitrile (AIBN), or the like.

Explaining the dispersant, oligoradicals grown from the radicals of initiator after the initiation of polymerization may be separated and precipitated from the continuous phase as their sizes increase. The preliminary particles thus precipitated may be stabilized by the dispersant and absorb a larger amount of monomers as the particle size increases, and thus they may be grown as particles. Particular non-limiting examples of the dispersant that may be used include poly(vinylpyrrolidone) (PVP), or the like.

Meanwhile, radical polymerizable monomers may react continuously with the radicals generated by the initiator during the polymerization, and grow to be polymer capsules. Particular non-limiting examples of the monomers that may be used include methyl methacrylate (MMA), or the like.

According to an example embodiment, the method may include carrying out freeze-drying after the polymerization of polymer capsules. Freeze-drying may prevent agglomeration of capsules during washing and drying of the capsules. Thus, freeze-drying may facilitate homogeneous dispersion of capsules in the optical resin without agglomeration (aggregates).

More particularly, according to an example embodiment, the method may include: mixing a surfactant, dispersant and an organic solvent; adding radical polymerizable monomers and a radical polymerization initiator to a resultant mixture and then heating the mixture to polymerize polymer capsules; freeze-drying the polymer capsules; and mixing freeze-dried polymer capsules with an optical resin and coating a substrate with a resultant mixture.

According to an example embodiment, when the optical resin is a photocurable or thermosetting resin, curing may be carried out by light irradiation (e.g. using a UV lamp) or by heating after the coating operation.

According to an example embodiment, the method may allow easy control of the size (average size) of the polymer capsules.

For example, in case of radical polymerization, it is possible to obtain capsules having a uniform size as well as random sizes by adjusting the homogeneity of capsules depending on time. That is, according to an example embodiment, when carrying out polymerization of polymer capsules, capsule formation may begin 2 hours after the reaction starts and capsules with a uniform size may be formed during this time. After the lapse of 7 hours from the start of reaction, capsules with random sizes may be formed. In addition, when the reaction is carried out for 10 hours or more, capsules with random sizes may be converted into capsules with a uniform size so as to reach equilibrium. Thus, it is possible to polymerize capsules with a uniform size as well as capsules with random sizes by adjusting the time required for polymerizing polymer capsules.

Accordingly, it is possible to obtain polymer capsules having an average particle size of 0.1-150 μm, for example.

According to an example embodiment, the polymer capsules may have random particle sizes. As compared to polymer capsules with a uniform size (i.e., the case where the capsules having one average particle size are present), polymer capsules with random sizes (i.e., the case where capsules having at least two different average particle sizes are mixed) may have lower heat conductivity, and thus are better in terms of heat insulation. When polymer capsules having different sizes (different average sizes) are mixed, a larger amount of polymer capsules may be present in the same volume than polymer capsules with a uniform size. This results in lower heat conductivity. From the viewpoint of heat insulation, lower heat conductivity means better heat insulation. Therefore, if polymer capsule is contained in the same content, capsules with random sizes (the case where polymer capsules having at least two different average particle sizes are mixed) may show similar transparency but better heat-insulating property as compared to capsules with a uniform size.

According to an example embodiment, additives may be further introduced when preparing the transparent heat-insulating film.

For example, metallic materials or ceramic materials may be used as additives to provide a heat-shielding function through light reflection or light absorption. When using such light reflective or light absorptive additives, it is possible to maximize heat shielding through light reflection or absorption in addition to said heat-insulating property of the transparent heat-insulating film. Such light reflective or light absorptive additives may be incorporated together with the polymer capsules to the transparent heat-insulating resin layer or may be formed as a separate layer.

That is, according to an example embodiment, the transparent heat-insulating film may include: a substrate; a transparent heat-insulating resin layer formed on either side or both sides of the substrate; and a layer including a light reflective or light absorptive additive and formed on the transparent heat-insulating resin layer or on the substrate where transparent heat-insulating resin layer is not formed thereon.

The additive or additive layer is added or formed in such a manner that the transparency of the whole transparent heat-insulating film is not degraded. Particular non-limiting examples of the additives that may be used include nanoparticles such as ceramic nanoparticles or metal nanoparticles.

The transparent heat-insulating film obtained as disclosed herein may include polymer capsules therein and have high heat-insulating property, and thus it may reduce transmission of radiative heat of solar radiation energy entering from the exterior and prevent discharge or loss of heat when indoor heating, while showing high transparency as well. Therefore, the transparent heat-insulating film disclosed herein may be very useful as a heat-shielding or heat-insulating film for windows of buildings (particularly, glass-walled buildings), houses, cars, or the like.

The examples and experiments will now be described. The following examples and experiments are for illustrative purposes only and not intended to limit the scope of the present disclosure.

EXAMPLES AND COMPARATIVE EXAMPLE

Preparation of Polymer Capsules

Methyl methacrylate (MMA) (10 wt %), dioctyl sulfosuccinate sodium salt (AOT) (0.45 wt %), poly(vinylpyrrolidone) (PVP) (4 wt %), 2,2'-azobisisobutyronitrile (AIBN) (0.1 wt %) and methanol (85.45 wt %) are mixed in a weight ratio of 10:0.45:4:0.1:85.45.

Particularly, to carry out polymerization of polymer capsules, a three-necked flask is purged with argon, AOT (0.45 wt %, 0.9 g), PVP (4 wt %, 4 g) and MeOH (85.45 wt %, 108 mL) are introduced thereto, and the reaction mixture is agitated under 1000 rpm for about 10 minutes until the materials are dissolved completely. To the resultant mixed solution, MMA monomer (10 wt %, 10 g) and AIBN (0.1 wt %, 0.1 g) are added, and the mixture is agitated under 400 rpm at 58° C. The solution, which originally is transparent, becomes turbid when the reaction starts. After the lapse of 2 hours from the start of reaction, formation of MMA capsules begins, wherein dented capsules with a uniform size are formed. After the lapse of 7 hours from the start of reaction, capsules with random sizes are formed. In addition, after the lapse of 10 hours or more from the start of reaction, the capsules with random sizes are converted into capsules with a uniform size in order to maintain a stable state. The PMMA capsules thus obtained are washed with deionized water three times, and subjected to centrifugal separation. This allows removal of unreacted monomers and solvent. The resultant PMMA capsules may be subjected to freeze-drying to obtain capsules in the form of fine powder.

Figure 2:
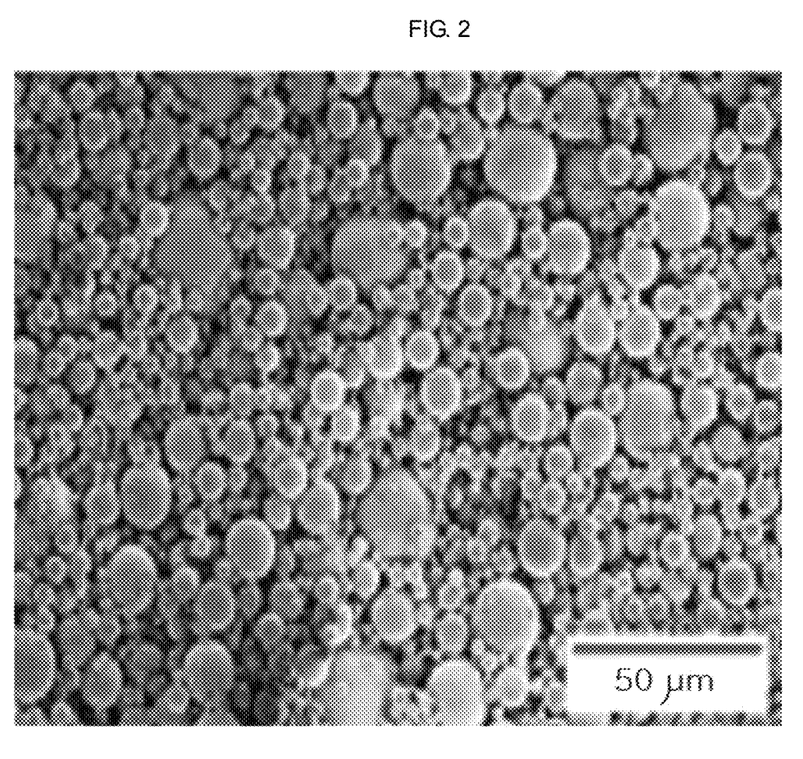
FIG. 2 is a SEM image of the spherical polymer capsules obtained in Examples.

FIG. 2 is an SEM image of the spherical polymer capsules obtained from Examples.

As can be seen from FIG. 2, spherical polymer capsules having an average particle size of 7-20 μm are formed. For reference, as shown in FIG. 2, the capsules are controlled to have random sizes.

Production of Transparent Heat-Insulating Film

An optical resin (acrylic resin) is mixed with the spherical polymer capsules obtained as described above in an amount of 0 wt % (Comparative Example), 10 wt % (Example 1), 20 wt % (Example 2) and 30 wt % (Example 3).

The polymer capsules and the optical resin have a refractive index of 1.49361 and 1.5, respectively, as measured by using an Abbe refractometer.

Meanwhile, a sheet of PET film is prepared and the mixture of optical resin with polymer capsules is dropped onto the PET film and coated by using a bar coater. The coating is carried out by setting the bar coater to the conditions of a coating thickness of 80 μm and a coating speed of 4 mm/s.

The film thus obtained is subjected to photocuring by light irradiation using a UV lamp for 2 minutes.

Figure 3A:
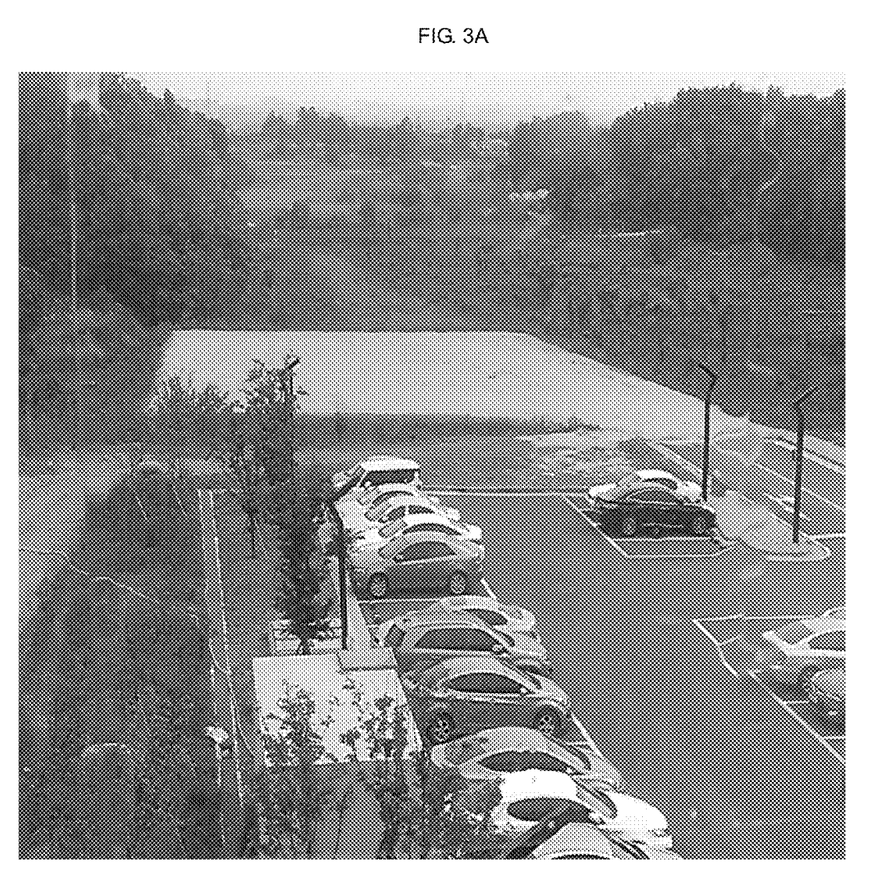
Figure 3B:
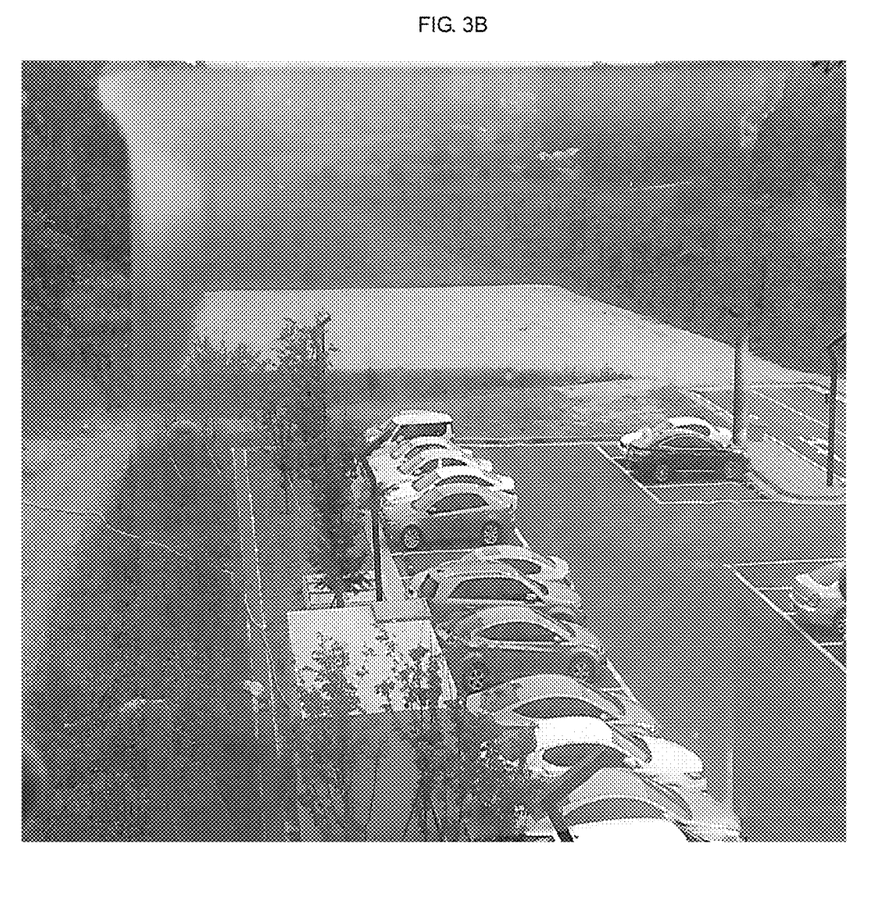

FIG. 3 shows an actual photo of the transparent film (0 wt % of polymer capsules, FIG. 3a) according to Comparative Example and that of the transparent heat-insulating film (containing 30 wt % of polymer capsules, FIG. 3b) according to Example 3.

As shown in FIG. 3, the film including polymer capsules shows no light distortion after measuring haze, as compared to the film using the optical resin alone.

Figure 4:
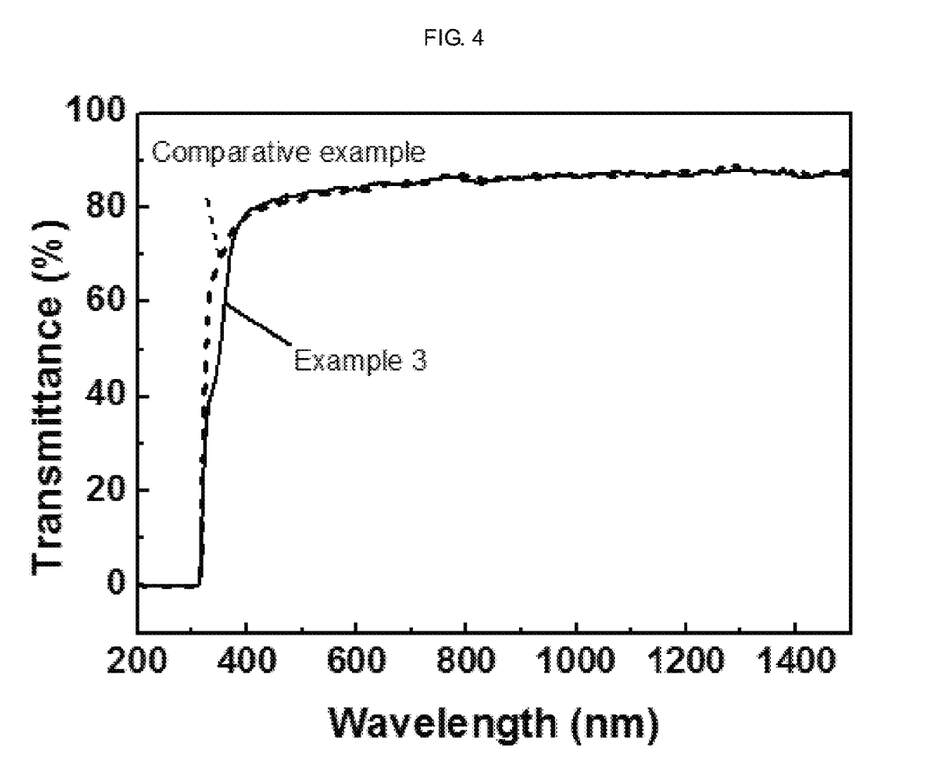

Meanwhile, FIG. 4 is a graph illustrating the results of transmittance of the transparent heat-insulating film according to Example 3 and the transparent film according to Comparative Example, as determined by a UV-Vis spectrometer. The base line corresponds to a quartz plate serving as reference. Comparative Example sows the UV transmittance of a PET film, while Example 3 shows the UV transmittance of PET film+optical resin+30 wt % of polymer capsules. In FIG. 4, X axis shows a wavelength (unit: nm) and Y axis shows transmittance (unit: %).

FIG. 4 demonstrates that even when the polymer capsules are incorporated to an extent of 30 wt %, the two films show substantially the same transmittance with a difference in transmittance of 1% or less.

Heat conductivities of each transparent heat-insulating films according to Comparative Example and Examples 1-3 are measured by using a heat conductivity tester three times, and the average value is calculated.

TABLE 1

| Content of polymer capsules | Heat conductivity (W/mK) | Average value |
|---|---|---|
| 0 wt % (substrate/optical resin) | 0.18 | 0.18 |
| 10 wt % (substrate/optical resin + polymer capsules 10 wt %) | 0.16 0.15 0.155 | 0.15 |
| 20 wt % (substrate/optical resin + polymer capsules 20 wt %) | 0.13 0.131 0.129 | 0.13 |
| 30 wt % (substrate/optical resin + polymer capsules 30 wt %) | 0.10 0.11 0.11 | 0.10 |

Figure 5:
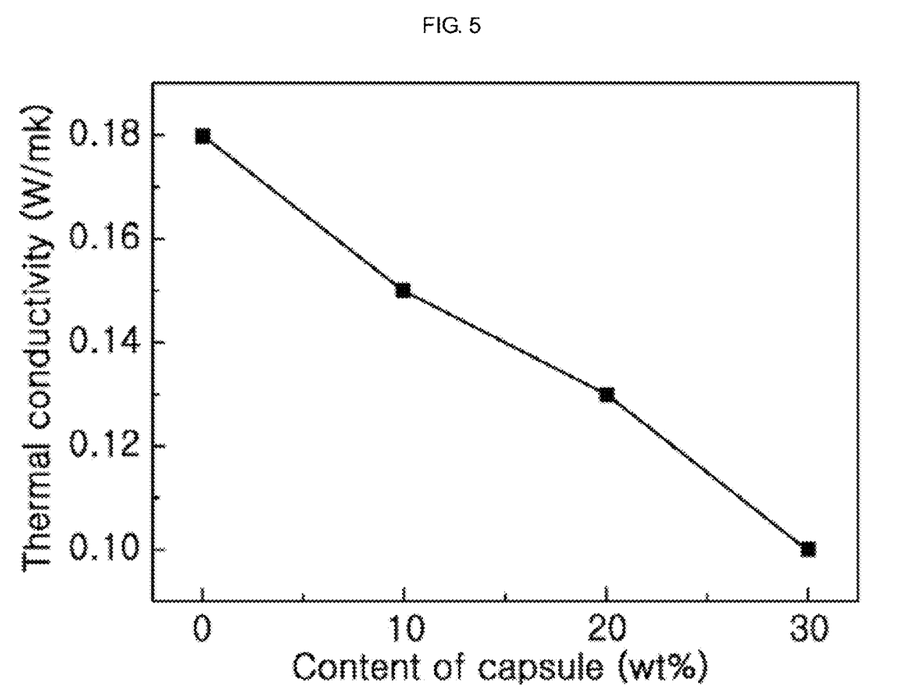

FIG. 5 is a graph illustrating the results of heat conductivity of the transparent heat-insulating films according to Comparative Example and Examples, as determined by a heat conductivity tester. In FIG. 5, X axis shows a capsule content (unit: wt %) and Y axis shows heat conductivity (unit: W/mK).

As can be seen from FIG. 5, as the content of polymer capsules increases, the heat conductivity decreases (heat-insulating property increases).

As described above, according to example embodiments, it is possible to provide a transparent heat-insulating film having excellent heat-insulating property while showing high transparency as well. In addition, it is possible to control the size of capsules contained in a transparent heat-insulating film with ease, and the transparent heat-insulating film may be obtained through a simple and easy process, which is cost-efficient and suitable for mass production. Further, it is possible to control the light transmittability and heat-insulating property of a transparent heat-insulating film with ease.

What is claimed is:

1. A method for preparing a transparent heat-insulating material, comprising:
preparing polymer capsules; and
mixing the polymer capsules with an optical resin,
wherein the polymer capsules have average particle size of 7-20 in and are a mixture of the polymer capsules having at least two different average particle sizes from the average particle size of 7-20 μm.

2. The method for preparing a transparent heat-insulating material according to claim 1, further comprising coating a substrate with a mixture of the polymer capsules and the optical resin to form a transparent heat-insulating resin layer on the substrate.

3. The method for preparing a transparent heat-insulating material according to claim 2, further comprising removing the substrate from the transparent heat-insulating resin layer after coating.

4. The method for preparing a transparent heat-insulating material according to claim 1, wherein the polymer capsules are prepared by radical polymerization, and the average particle size of the polymer capsules is controlled by adjusting polymerization reaction time.

5. The method for preparing a transparent heat-insulating material according to claim 1, wherein the polymer capsules are prepared through radical polymerization by mixing and heating a surfactant, dispersant, organic solvent, radical polymerizable monomers and a radical polymerization initiator, and the average particle size of the prepared polymer capsules is controlled by adjusting a content of the surfactant.

6. The method for preparing a transparent heat-insulating material according to claim 1, wherein transparency and heat-insulating property of the transparent heat-insulating material are controlled by adjusting at least one selected from the group consisting of mixing ratio between the polymer capsules and the optical resin, difference in refractive index between the polymer capsules and the optical resin, and the average particle size of the polymer capsules.

7. The method for preparing a transparent heat-insulating material according to claim 6, wherein the polymer capsules are contained in an amount of 0.1 wt %-60 wt % based on 100 wt % of the total weight of the polymer capsules and the optical resin, the difference in refractive index is 0-0.1.

* * * * *

UNITED STATES PATENT AND TRADEMARK OFFICE
CERTIFICATE OF CORRECTION

PATENT NO. : 9,950,340 B2  
APPLICATION NO. : 14/519325  
DATED : April 24, 2018  
INVENTOR(S) : Munju Goh et al.

Page 1 of 1

It is certified that error appears in the above-identified patent and that said Letters Patent is hereby corrected as shown below:

In the Claims

Column 10, correct Claim 1, Line 6, from "7-20 in" to "7-20$\mu$m"

Signed and Sealed this  
Twenty-ninth Day of May, 2018

Andrei Iancu  
*Director of the United States Patent and Trademark Office*